(12) United States Patent
Lim (10) Patent No.: US 7,140,734 B2
(45) Date of Patent: Nov. 28, 2006

(54) IMAGE PROJECTION APPARATUS (75) Inventor: Seon-woo Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 105 days.

(21) Appl. No.: 10/859,296

(22) Filed: Jun. 3, 2004

(65) Prior Publication Data

US 2004/0263799 A1 Dec. 30, 2004

(30) Foreign Application Priority Data

Jun. 24, 2003 (KR) ............... 10-2003-0041056

(51) Int. Cl.
*G03B 21/16* (2006.01)
*F21V 29/00* (2006.01)
*F21V 7/20* (2006.01)
*H04N 5/74* (2006.01)
*G02F 1/1333* (2006.01)

(52) U.S. Cl. ............ 353/61; 353/58; 353/60; 362/294; 362/345; 362/373; 348/748; 349/161

(58) Field of Classification Search ............ 353/61, 353/52, 57, 58, 60, 119, 122; 362/294, 345, 362/373; 349/161; 348/748
See application file for complete search history.

(56) References Cited

U.S. PATENT DOCUMENTS

| 3,920,323 | A  | * | 11/1975 | Nishitani ............... 353/61 |
| 5,951,136 | A  | * | 9/1999  | Furuhata et al. ............ 353/31 |
| 6,231,191 | B1 | * | 5/2001  | Shiraishi et al. ............ 353/61 |
| 6,290,360 | B1 | * | 9/2001  | Konuma et al. ............ 353/61 |
| 6,443,575 | B1 |   | 9/2002  | Miyamoto et al. |
| 6,471,357 | B1 | * | 10/2002 | Hara et al. ............... 353/57 |
| 6,488,378 | B1 |   | 12/2002 | Tabuchi et al. |
| 6,814,446 | B1 | * | 11/2004 | Yamada et al. ............ 353/60 |
| 2002/0018183 | A1 | * | 2/2002 | Ito et al. ............... 353/20 |
| 2002/0021416 | A1 | * | 2/2002 | Ogawa ............... 353/51 |
| 2002/0075457 | A1 | * | 6/2002 | Wang et al. ............... 353/61 |
| 2003/0164926 | A1 | * | 9/2003 | Nakano et al. ............ 353/31 |
| 2003/0179579 | A1 | * | 9/2003 | Hsu et al. ............... 362/294 |

FOREIGN PATENT DOCUMENTS

| JP | 08-094990    | 4/1996 |
| JP | 2000-081673  | 3/2000 |
| JP | 2001-042435  | 2/2001 |
| JP | 2001-092012  | 4/2001 |
| JP | 2001-133885  | 5/2001 |
| JP | 2001-183746  | 7/2001 |

(Continued)

OTHER PUBLICATIONS

Korean Official Action issued on Jul. 1, 2005, for Korean Patent Application No: 10-2003-0041056.

(Continued)

*Primary Examiner*—W. B. Perkey
*Assistant Examiner*—Rochelle Blackman
(74) *Attorney, Agent, or Firm*—Stanzione & Kim, LLP (57) ABSTRACT

An image projection apparatus includes a lamp, an optical modulator which modulates light emitted from the lamp to correspond to image data, a ballast which operates the lamp, a power supply unit, and a duct in which the power supply unit, the ballast, and the lamp are accommodated. The duct includes a first absorption hole and a main exhaust hole that communicate with an outside, and forms an air-flow path on which the first absorption hole, the power supply unit, the ballast, the lamp, and the main exhaust hole are disposed.

27 Claims, 6 Drawing Sheets

FOREIGN PATENT DOCUMENTS

| | | |
|---|---|---|
| JP | 2002-040562 | 2/2002 |
| JP | 2002-090875 | 3/2002 |
| JP | 2002-189251 | 7/2002 |
| JP | 2002-365728 | 12/2002 |
| JP | 2003-035930 | 2/2003 |
| KR | 2003-0019575 | 3/2003 |

OTHER PUBLICATIONS

Korean Office Action dated Dec. 16, 2005 issued in KR 2003-41056.

* cited by examiner

IMAGE PROJECTION APPARATUS

CROSS-REFERENCE TO RELATED APPLICATIONS

This application claims the priority of Korean Patent Application No. 2003-41056, filed on Jun. 24, 2003, in the Korean Intellectual Property Office, the disclosure of which is incorporated herein in its entirety by reference.

BACKGROUND OF THE INVENTION

1. Field of the Invention

The present general inventive concept relates to an image projection apparatus, and more particularly, to an image projection apparatus having a duct and a fan to cool each of elements of the image projection apparatus, such as a lamp or the like.

2. Description of the Related Art

Figure 1:
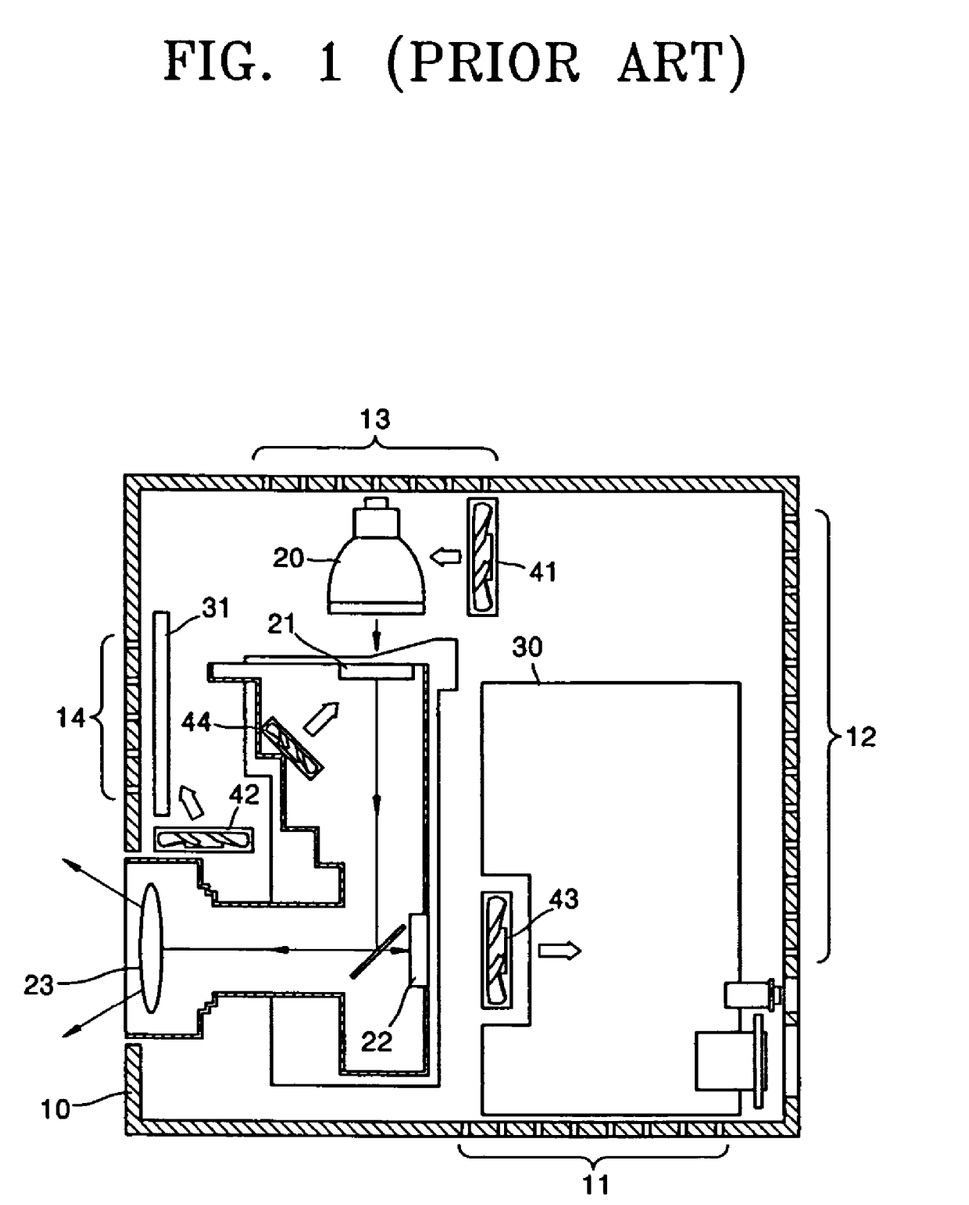
FIG. 1 is a plane view schematically showing a structure of a conventional image projection apparatus.

FIG. 1 is a plane view schematically showing a structure of a conventional image projection apparatus. A lamp 20, a color wheel 21, a digital mirror device (DMD) 22, and a projection lens 23 are shown in FIG. 1. The lamp 20, the color wheel 21, the DMD 22, and the projection lens 23 constitute an optical system for projecting an image. Reference numeral 30 denotes a power supply unit (PSU), and reference numeral 31 denotes a ballast for operating the lamp 20. Reference numeral 10 denotes a housing, and air vents 11, 12, 13, and 14 through which the air comes in and out are formed in the housing 10.

The lamp 20 radiates white light. The color wheel 21 includes a color filter through which each of red light, blue light, and green light passes selectively and which is rotatably installed before the lamp 20. When the white light irradiated by the lamp 20 passes through the color wheel 21, the white light is changed into monochromatic lights, such as red light, blue light or green light. The DMD 22 modulates the monochromatic lights passing through the color wheel 21 according to image data input from a control board (not shown). Modulated light is projected by the projection lens 23 on a screen (not shown).

Elements that need to be cooled to drive the image projection apparatus are the lamp 20 and the PSU 30, and if necessary, the DMD 22, the ballast 31, and the color wheel 21 can also be cooled. Four cooling fans 41, 42, 43, and 44 are shown in FIG. 1. The cooling fan 41 cools the lamp 20. The cooling fan 42 cools the ballast 31. The cooling fan 43 is installed to flow the air from the DMD 22 to the PSU 30 and cools both the DMD 22 and the PSU 30. The fan 44 cools the color wheel 21.

In the conventional image projection apparatus shown in FIG. 1, an additional fan for each of elements that need to be cooled is installed. Of course, a desired cooling performance can be obtained using the conventional image projection apparatus having the above structure. However, in the conventional image projection apparatus shown in FIG. 1, since a plurality of fans are installed to absorb and exhaust the air separately, paths through which the air comes in and out become complicated. Thus, it is difficult to effectively install the air vents 11, 12, 13, and 14. In addition, the air flowing through each fan collides with the housing 10. As such, a cooling efficiency may be lowered. In addition, the plurality of fans, which are separated from the complicated air-flow paths, may cause noise.

SUMMARY OF THE INVENTION

In order to solve the above and/or other problems, it is an aspect of the present general inventive concept to provide an image projection apparatus which includes a duct to accommodate elements that need to be cooled and in which air flows through the duct to effectively perform cooling.

Additional aspects and advantages of the present general inventive concept will be set forth in part in the description which follows and, in part, will be obvious from the description, or may be learned by practice of the general inventive concept.

The above and/or other aspects of the present general inventive concept may be achieved by providing an image projection apparatus to enlarge and project image data on a screen using light emitted from a lamp, the apparatus including a duct which includes a first absorption hole through which air is absorbed, and a main exhaust hole though which the air is exhausted, in which elements that need to be cooled are disposed in series, and in which an air-flow path is formed to cool the elements.

In an aspect of the present general inventive concept, the elements that need to be cooled are arranged according to an operating temperature, so that an element having a lower operating temperature than other elements is arranged to be disposed adjacent to the first absorption hole while another element having a higher operating temperature than other elements is disposed adjacent to the main exhaust hole.

In another aspect of the present general inventive concept, the elements that need to be cooled may be arranged in the order of an operating temperature from the first absorption hole to the main exhaust hole, may include a power supply unit to supply a power, a ballast to operate the lamp, and the lamp, and may further include an optical modulator which modulates the light irradiated from the lamp to correspond to the image data.

In yet another aspect of the present general inventive concept, the image projection apparatus may further include at least one fan to control the air to flow via the duct, the at least one fan including a first fan arranged between the power supply unit and the ballast and a second fan arranged between the ballast and the lamp. In addition, the at least one fan may further include a third fan which controls the air to flow into the duct via a second absorption hole to cool the optical modulator. In this case, the duct may further include the second absorption hole through which the duct communicates with the optical modulator, and the third fan may control the air to flow into the duct via the second absorption hole to cool the optical modulator. A cooling capacity of the second fan may be larger than a cooling capacity of each of the first fan and the third fan.

In still another aspect of the present general inventive concept, the image projection apparatus may further include a vane which is placed at an outlet of the first fan to induce the air to flow toward the ballast. The image projection apparatus may further include an induction duct which is diverged from the duct at an outlet of the second fan to induce the air to flow toward a front part of the lamp.

In yet another aspect of the present general inventive concept, a light leakage prevention unit which prevents light irradiated from the lamp from leaking via the main exhaust hole may be placed between the lamp and the main exhaust hole in the duct.

In another aspect of the present general inventive concept, the duct may include a first duct which accommodates the power supply unit and includes the first and second absorption holes, a second duct which accommodates the ballast and communicates with the first duct, and a third duct which accommodates the lamp, includes the main exhaust hole, and which communicates with the second duct. The first duct may comprise a shield to prevent electromagnetic interference (EMI). In addition, an absorption member may be installed on an inner wall of the second duct which absorbs an operating noise of the ballast. In addition, the second fan may be installed in the third duct. In this case, a dustproof member may be interposed between the second fan and the third duct to absorb vibration and noise generated from the second fan.

The above and/or other aspects of the present invention general inventive concept may also be achieved by providing an image projection apparatus including a first and a second and a third ducts connected in series to form an air-flow path along which air flows within the first and second and third ducts, an absorption hole formed on the first duct, a main exhaust hole formed on the third duct, a lamp dispose in the third duct, and a first and a second elements having a first and a second operating temperatures lower than a third operating temperature of the lamp and disposed in the first duct and the second ducts, respectively.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
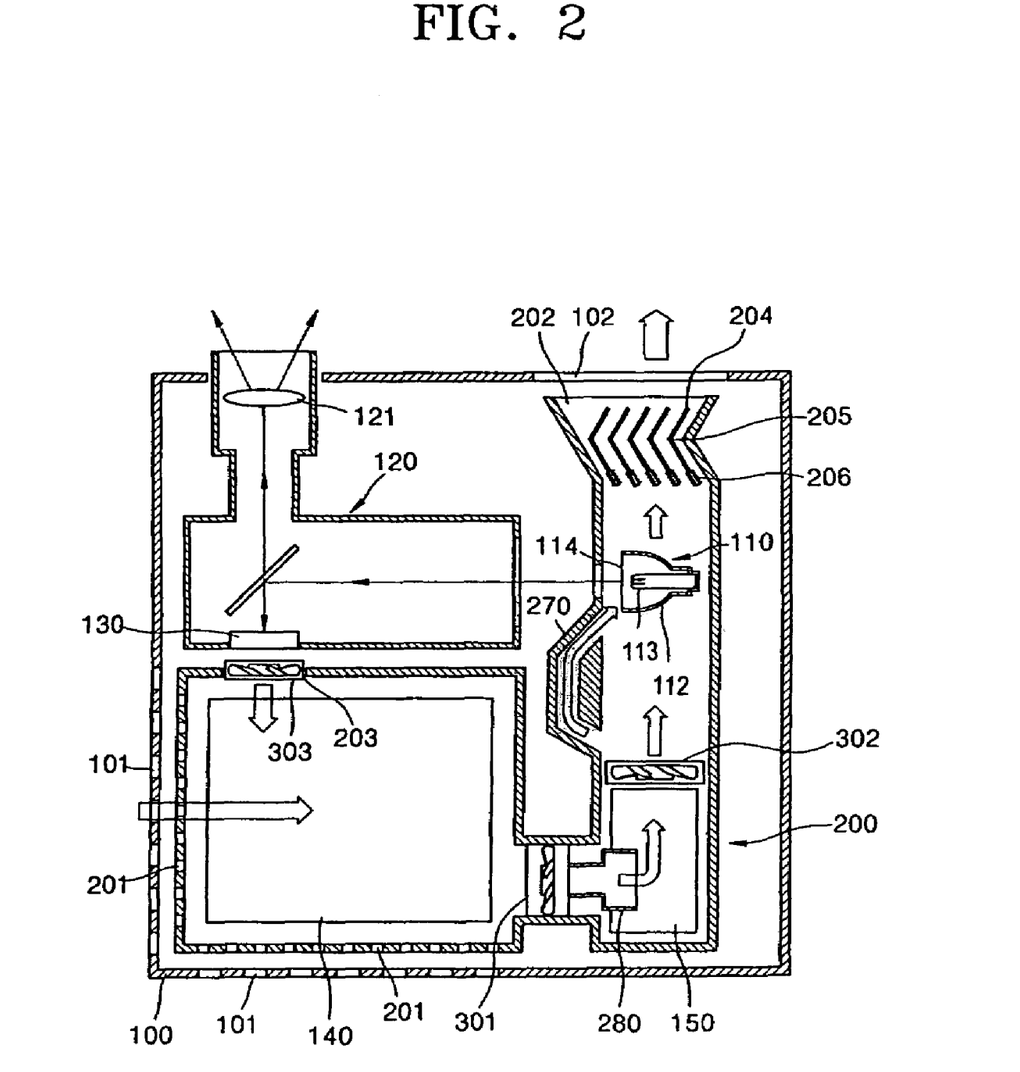
FIG. 2 is a plane view schematically showing a structure of an image projection apparatus according to an embodiment of the present general inventive concept.

FIG. 2 is a plane view schematically showing a structure of an image projection apparatus according to an embodiment of the present general inventive concept.

A lamp 110, an optical system 120, and a digital mirror device (DMD) 130 which is an example of an optical modulator, are shown in FIG. 2. The optical system 120 can include light irradiated from the lamp 110 to be projected on a screen (not shown) via the DMD 130. The optical system 120 may include optical elements, such as a color wheel, a projection lens 121, and a reflective mirror. An optical system for an image projection apparatus is well known, and thus, detailed descriptions thereof will be omitted. The DMD 130 is an optical modulator which modulates incident light according to image data and controls the modulated light to form image light having a desired image. The DMD 130 is well, and thus, detailed descriptions thereof will be omitted. A liquid crystal display (LCD) panel may be used as the optical modulator. The incident light emitted from the lamp 110 is modulated by the DMD 130 to form the image light having the desired image. The image light is enlarged and projected by the projection lens 121 on the screen (not shown).

A power supply unit (PSU) 140 can be placed behind the DMD 130, and a main control board (not shown) to control the image projection apparatus may be installed on an upper side of the PSU 140. A ballast 150 can be placed at one side of the PSU 140 to operate the lamp 110.

A duct 200 is shown in FIG. 2. The duct 200 can connect elements that need to be cooled, such as the PSU 140, the ballast 150, and the lamp 110, in series. The duct 200 accommodates the PSU 140, the ballast 150, and the lamp 110. An air-flow path can be formed in the duct to cool the PSU 140, the ballast 150, and the lamp 110. The duct 200 may include a first absorption hole 201 and a main exhaust hole 202. The air is absorbed (introduced) into the dust 200 through the first absorption hole 201. Due to the air, the PSU 140, the ballast 150, and the lamp 110 are cooled, and the air is exhausted outside via the main exhaust hole 202. In this case, one of the PSU 140, the ballast 150, and the lamp 110 which may have the smallest heat radiation can be arranged adjacent to the first absorption hole 201, and another one of the PSU 140, the ballast 150, and the lamp 110 which may have the greatest heat radiation can be arranged adjacent to the main exhaust hole 202. In another aspect of the present general inventive concept, one of the PSU 140, the ballast 150, and the lamp 110 which may have the lowest operating temperature can be arranged adjacent to the first absorption hole 201, and one of the PSU 140, the ballast 150, and the lamp 110 which may have the highest operating temperature can be arranged adjacent to the main exhaust hole 202. Thus, in this embodiment, the PSU 140, the ballast 150, and the lamp 110 are sequentially arranged from the first absorption hole 201 to the main exhaust hole 202.

Reference numeral 100 denotes a housing. A plurality of air vents 101 and 102 through which the air comes in and out can be formed on the housing 100. In an aspect of the present general inventive concept, the air vent 101 may be disposed on an air-inflow path or may be disposed adjacent to the first absorption hole 201. In another aspect of the present general inventive concept, the air vent 102 may be disposed on an air-exhaust path or may be disposed adjacent to the main exhaust hole 202. By the above structure, an air-flow path is defined in the order of the air vent 101, the first absorption hole 201, the duct 200, the main exhaust hole 202, and the air vent 102. A plurality of absorption holes (not shown) may be further provided on the duct 200, and a plurality of air vents (not shown) adjacent to the absorption holes may be further provided on the housing 100.

A first fan 301 and a second fan 302 to control the air to flow into the duct 200 are shown in FIG. 2. The first fan 301 can be arranged between the PSU 140 and the ballast 150 to induce the air to flow from the PSU 140 to the ballast 150. The second fan 302 can be arranged between the ballast 150 and the lamp 110 to induce the air to flow from the ballast 150 to the lamp 110.

The image projection apparatus according to this embodiment may further include a third fan 303 to cool the DMD 130. In addition, the duct 200 may further include a second absorption hole 203. The third fan 303 can be installed behind the DMD 130, as shown in FIG. 2. The third fan 303 can supply the air into the duct 200 via the second absorption hole 203 to cool the DMD 130. The third fan 303 can absorb the air inside the housing 100 to flow into the duct 200 such that a color wheel (not shown) which is an element of the optical system 120 can be cooled. By the above structure, an air-flow path can be defined in the order of the air vent 101, the first and second absorption holes 202 and 203, the duct 200, the main exhaust hole 202, and the air vent 102.

In an aspect of this embodiment, when the cooling (ventilation) capacity of the first through third fans 301, 302, and 303 is determined, the second fan 302 may have the largest cooling capacity so that an air-flow is not accumulated in the duct 200, and the cooling capacity of the first fan 301 can be larger than the cooling capacity of the third fan 303.

A vane 280 may be provided in the duct 200. The vane 280 can be provided at an outlet of the first fan 301 to induce the air to the ballast 150, thereby improving the cooling efficiency of the ballast 150.

The image projection apparatus according to this embodiment may further include an induction duct 270 which induces the air to pass a front part 114 of the lamp 110 so that an electrode 113 of the lamp 110 is cooled. The induction duct 270 can be diverged from the duct 200 at an outlet of the second fan 302 and can be extended to the front part 114 of the lamp 110. By the above structure, the air can be supplied to the electrode 113 of the lamp 110 and a body 112 of the lamp 110, respectively, such that the lamp 110 can be more effectively cooled.

Referring to FIG. 2, the lamp 110 can be disposed adjacent to the main exhaust hole 202 of the duct 200. Thus, the light irradiated from the lamp 110 may leak out to an outside of the housing 100 via the main exhaust hole 202 and the air vent 102. A light leakage prevention unit can be provided between the lamp 110 of the duct 200 and the main exhaust hole 202. A plurality of ribs 204 can be used as the light leakage prevention unit and can extend from the outlet of the lamp 110 to the main exhaust hole 202 as shown in FIG. 2. The plurality of ribs 204 may include at least one curvature portion 205, and a progressive direction of the curvature portion 205 can be changed so that the light is cut off. In addition, the light leakage prevention unit may further include an uneven portion 206 formed on the plurality of ribs 204 to be disposed adjacent an end of the lamp 110. The uneven portion 206 can reflect the light to be returned to the lamp 110, thereby preventing the light from leaking out through the main exhaust hole 202. In addition, part of air-flow noise can be cut off by the ribs 204 and the uneven portion 206.

In the image projection apparatus according to this embodiment, the air-flow path can be defined by the duct 200. While the air flows into the housing 100 and passes through the duct 200 along which the air-flow path is formed, and in which an absorption hole and an exhaust hole are defined, the PSU 140, the ballast 150, and the lamp 110 can be sequentially cooled, and the air is exhausted to the outside of the housing 100. Thus, collision of air flows does not occur in the housing 100 of this embodiment like in the conventional image projection apparatus shown in FIG. 1, and the lowering of a cooling efficiency caused by an ineffective air-flow can be minimized.

Since the conventional image projection apparatus shown in FIG. 1 does not include the duct 200 to define the air-flow path to cool each element, for example, since the air cooling the lamp that operates at a high temperature may flow to the PSU 30 or the DMD 22 that operates at a lower temperature. In this case, a temperature of the air, which is a cooling medium, can be higher than the temperature of the PSU 30 or the DMD 22, and thus, the PSU 30 or the DMD 22 may be heated rather than being cooled.

In the image projection apparatus according to this embodiment, elements that need to be cooled can be arranged in the duct 200 along a direction of an air flow according to an operating temperature of the elements, that is, an element having a lower operating temperature than other elements is arranged adjacent to an inlet of the duct 100 while another element having a higher operating temperature that other elements is arranged adjacent to an outlet of the duct 100. Thus, in the image projection apparatus according to the this embodiment, unless an amount and a speed of the air flowing into the duct 200 are very small and low, the temperature of the air which is the cooling medium can be hardly higher than the temperature of the elements that need to be cooled. In particular, the lamp 110 can be an element that operates at the highest temperature in the image projection apparatus. In general, the electrode 113 of the lamp 110 needs to be maintained at about 300° C., and the body 112 of the lamp 110 needs to be maintained at about 850° C. It can be known from an experiment that the temperature of the electrode 113 can be improved from about 320° C. to about 270° C. and the temperature of the body 112 can be improved from about 910° C. to about 850–860° C., compared with the conventional image projection apparatus.

Figure 3:
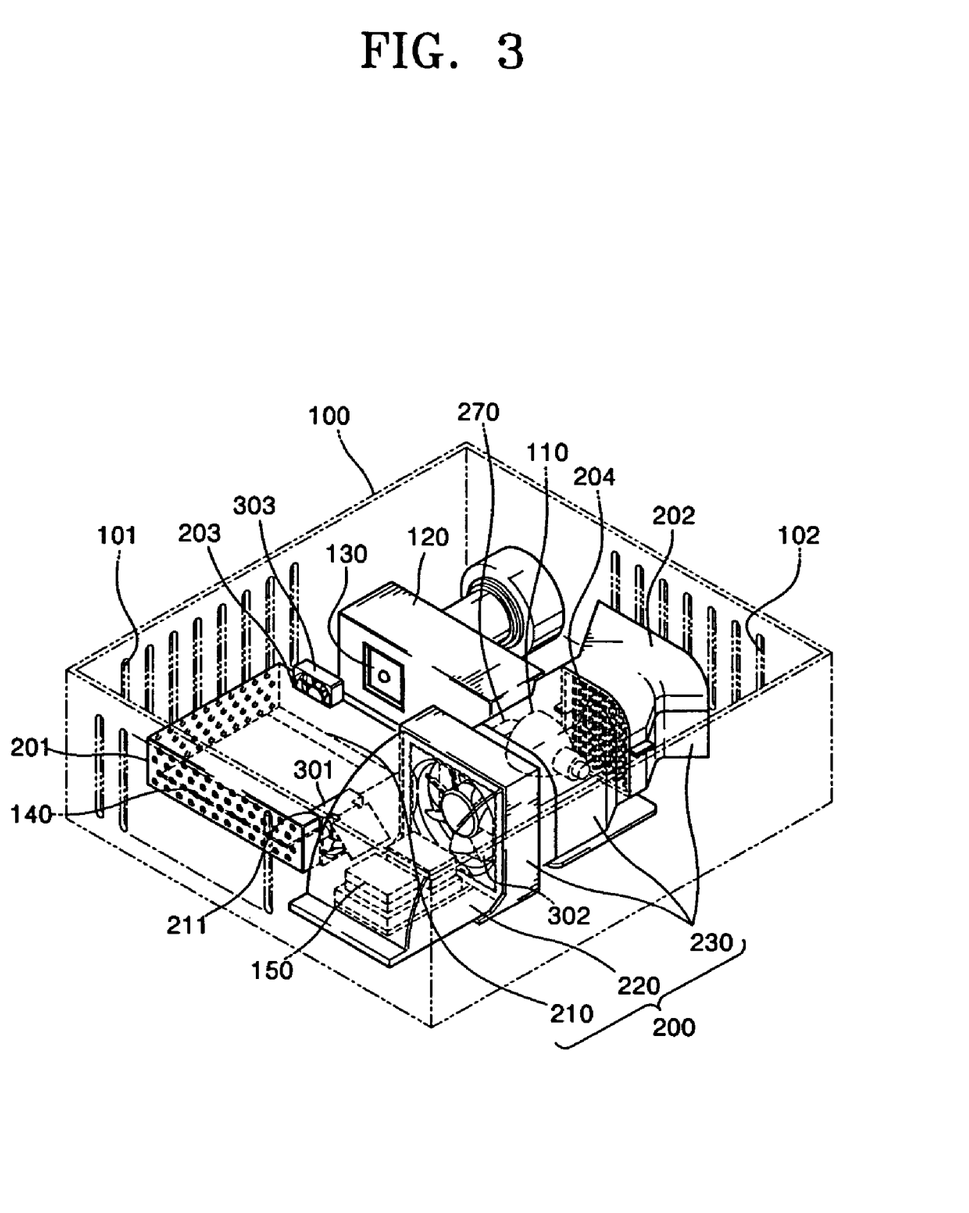
FIG. 3 is a perspective view showing a structure of an image projection apparatus according to another embodiment of the present general inventive concept.
Figure 4:
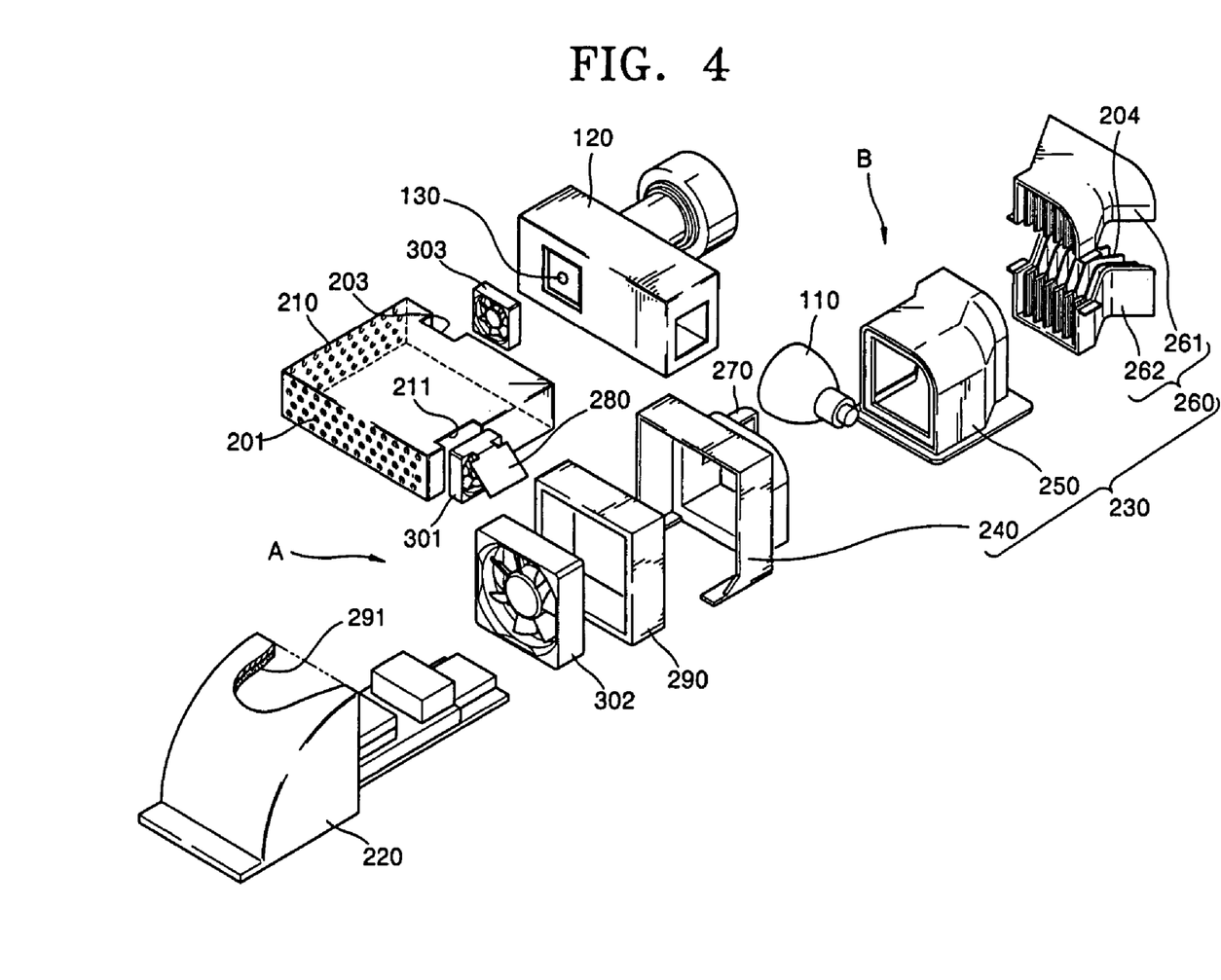
FIG. 4 is an exploded perspective view showing the image projection apparatus of FIG. 3.

FIG. 3 is a perspective view showing a structure of an image projection apparatus according to another embodiment of the present general inventive concept. A duct 200 may be manufactured in various shapes. As an example thereof, in the embodiment shown in FIG. 3, the duct 200 can be formed by connecting first through third ducts 210, 220, and 230 within a housing 100. FIG. 4 is an exploded perspective view showing the image projection apparatus of FIG. 3.

Figure 5:
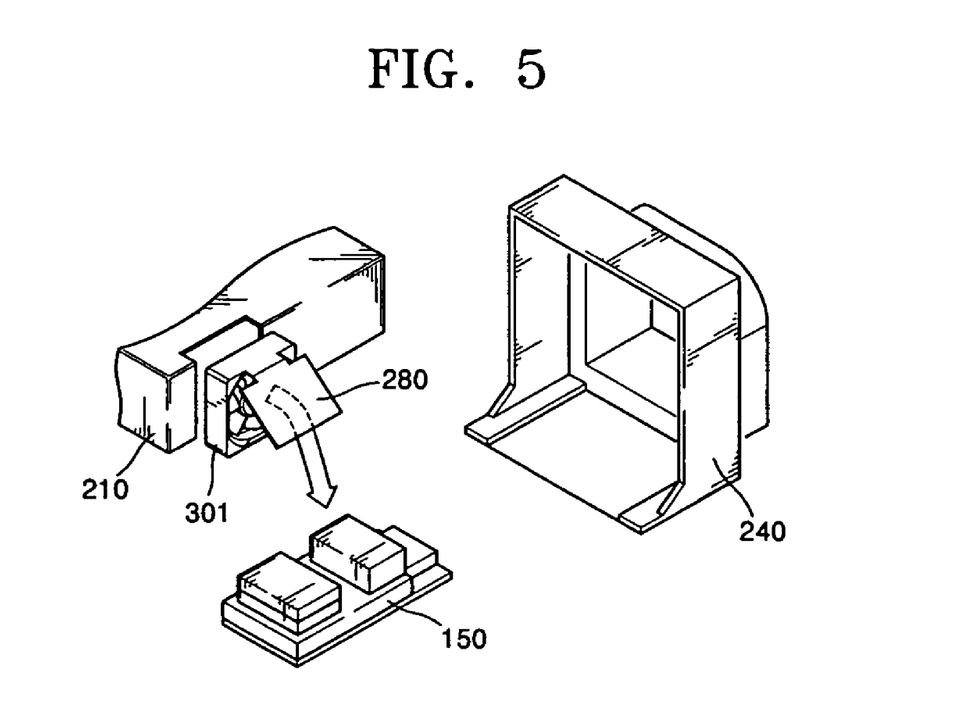
FIG. 5 is a partial perspective view showing a portion A of FIG. 4.
Figure 6:
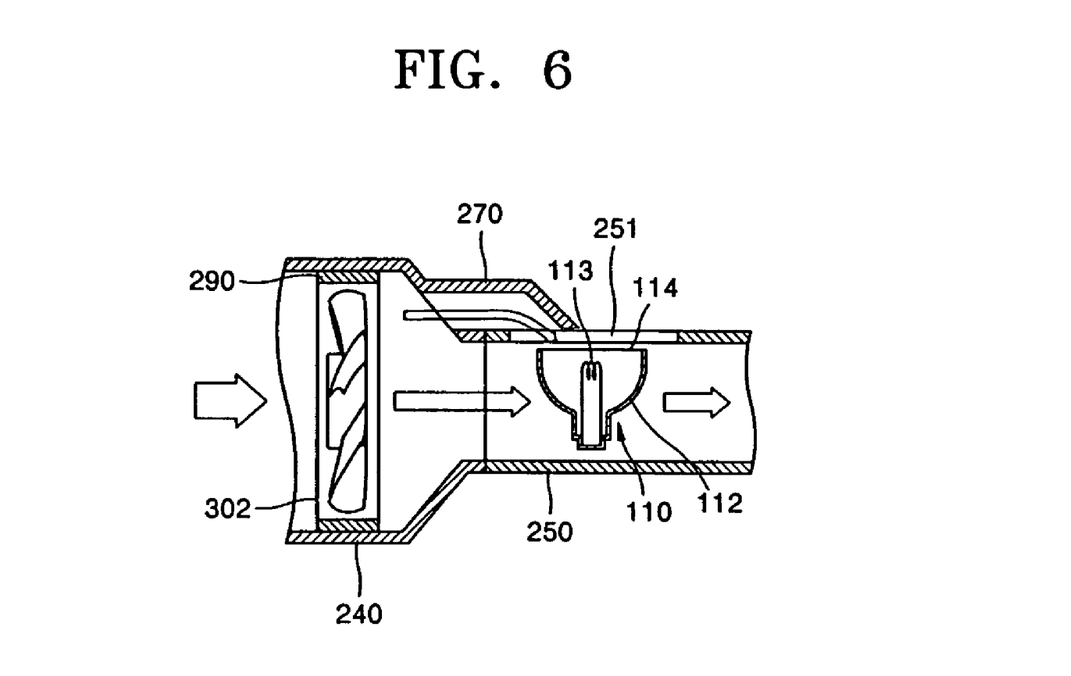
FIG. 6 is a cross-sectional view schematically showing a portion B of FIG. 4.
Figure 7:
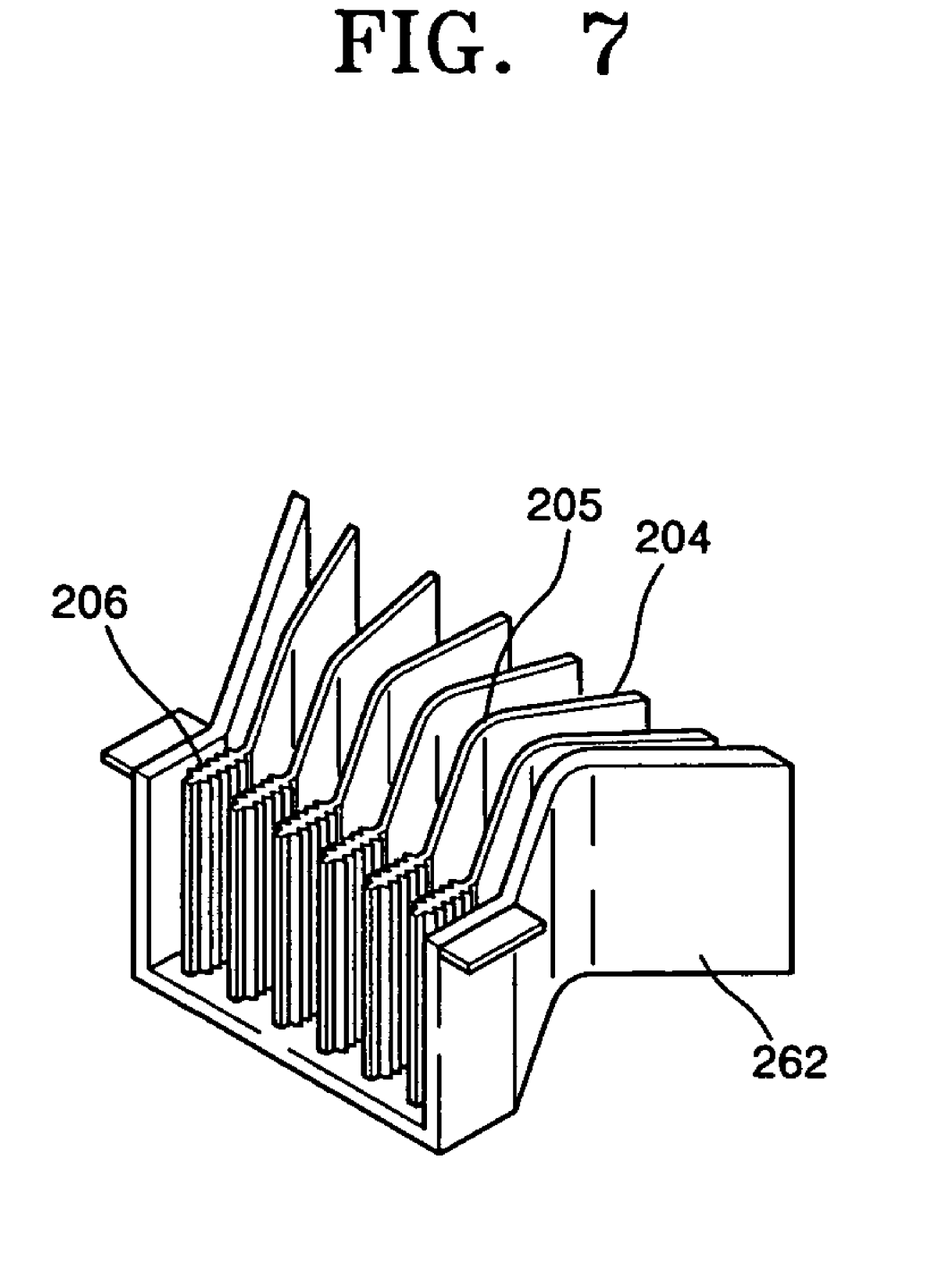
FIG. 7 is a perspective view showing an exhaust duct of the image projection apparatus of FIG. 4.

FIG. 5 is a partial perspective view showing a portion A of FIG. 4. FIG. 6 is a cross-sectional view schematically showing a portion B of FIG. 4. FIG. 7 is a perspective view showing an exhaust duct of the image projection apparatus of FIG. 4.

Referring to FIG. 3, the duct 200 may include the first through third ducts 210, 220, and 230 that communicate with one another. A PSU 140 is accommodated in the first duct 210. The first duct 210 may include a first absorption hole 201 through which the air is absorbed (introduced) into an inside of the first duct 210, and a first exhaust hole 211 that communicates with the second duct 220. In addition, the first duct 210 may further include a second absorption hole 203 to face a third fan 303. The second absorption hole 203 can be a portion of an air-flow path to cool a DMD 130. The first fan 301 can be installed in the duct 200 adjacent to the first exhaust hole 211. The first duct 210 may be a shield for electromagnetic interference (EMI), and the shield may be formed of an iron plate, for example.

The second duct 220 communicates with the first duct 210 and the third duct 230, and a ballast 150 can be accommodated in the second duct 220. In an aspect of this embodiment, a sound-absorbing member 291 to cut off an operating noise of the ballast 150 can be provided on an inner wall of the second duct 220 as shown in FIG. 4. The sound-absorbing member 291 may be formed of sponge or a rubber material. The first fan 301 may supply the air from the first duct 210 to the second duct 220 so as to cool the ballast 150. Referring to FIG. 5, the vane 280 can be provided at an outlet of the first fan 301. The vane 280 can induce the air to flow by the first fan 301 into the second duct 220 toward the ballast 150. In this embodiment, the ballast 150 can be installed under the first fan 301, and the vane 280 can be installed to induce the air to flow by the first fan 301 downwards. The vane 280 may be installed on a frame of the first fan 301, as shown in FIG. 5, and may be installed in the first duct 210 or the second duct 220.

As shown in FIG. 4, the third duct 230 may include a guide duct 240, a lamp cover 250, and an exhaust duct 260, which communicate with one another, for example. The guide duct 240 communicates with the second duct 220, and a second fan 302 is installed in the guide duct 240. In an aspect of this embodiment, a dustproof member 290, shown in FIGS. 4 and 6, can be interposed between the second fan 302 and the guide duct 240, so as to cut off vibration and noise generated from the second fan 302 when the second fan 302 is installed in the guide duct 240. The dustproof member 290 may be formed of rubber or sponge, for example. The lamp 110 can be accommodated in a lamp holder 250. As shown in FIG. 6, a light window 251 through which light irradiated from the lamp 110 passes is provided on the lamp holder 250.

An induction duct 270 can be provided in the guide duct 240. As shown in FIG. 6, the induction duct 270 can be diverged from the guide duct 240 at an outlet of the second fan 302 and can extend to a front part 114 of the lamp 110. By the above structure, part of the air supplied by the second fan 302 can be directly supplied to the lamp holder 250 to cool a body 112 of the lamp 110 and to cool an electrode 113 of the lamp 110 via the induction duct 270.

The main exhaust hole 202 can be provided in the exhaust duct 260. Referring to FIG. 4, the exhaust duct 260 can be formed by combining an upper duct 261 and a lower duct 262. A light leakage prevention unit can be provided in the exhaust duct 260 so that the light irradiated from the lamp 110 is prevented from leaking out through a main exhaust hole 202. Referring to FIG. 7 which shows a lower duct 262 in detail, a plurality of ribs 204 can be used as the light leakage prevention unit and can extend from an outlet of the lamp 110 to the main exhaust hole 202. The plurality of ribs 204 can include at least one curvature portion 205 of which progressive direction can be changed so that the light is cut off. In addition, the light leakage prevention unit may further include an uneven portion 206 formed on one end of the plurality of ribs 204 to be disposed adjacent to the lamp. The uneven portion 206 can reflect the light to be returned to the lamp 110, thereby preventing the light from leaking out through the main exhaust hole 202. In addition, the ribs 204 and the uneven portion 206 can cut off the noise caused by an air-flow and can prevent the light leakage.

In this way, the embodiments of FIGS. 3 through 7 may have the same effect as the embodiment of FIG. 2, and the image projection apparatus of FIG. 3 may be identical to that of FIG. 2, thus, repeated descriptions of identical parts will be omitted.

As described above, the image projection apparatus according to the present general inventive concept may have the following effects. First, elements that need to be cooled can be accommodated in a duct having an absorption hole and an exhaust hole, and air flows through the duct such that collision of an air-flow does not occur in a housing like in a conventional image projection apparatus, and the lowering of a cooling efficiency caused by an ineffective air-flow is minimized. Second, when elements that need to be cooled are arranged along a direction of the air flow in the duct in the order of an operating temperature, such that an element having a low operating temperature can be arranged adjacent to an inlet of the duct while another element having a high operating temperature can be arranged adjacent to an inlet of the duct. Thus, the temperature of the air, which is a cooling medium, is hardly higher than the temperature of elements that need to be cooled, and a cooling efficiency is improved. Third, an induction duct to cool an electrode of a lamp can be provided such that the lamp is effectively cooled. Fourth, a light leakage prevention unit can be provided such that light is prevented from leaking forwards. In addition, part of noise can be cut off by ribs and an uneven portion used as the light leakage prevention unit. Fifth, a sound-absorbing member can be installed at a portion where a ballast of the duct is accommodated, such that operating noise of the ballast is cut off.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image projection apparatus to enlarge and project image data on a screen using light emitted from a lamp, the apparatus comprising:
    a housing having a top panel, a bottom panel, and plurality of side panels;
    a duct which includes a first absorption hole disposed in a first one of the side panels through which the air is absorbed, and a main exhaust hole disposed in a second one of the side panels through which the air is exhausted, connects elements that need to be cooled in series, and forms an air-flow path to cool the elements; and
    at least one fan to control air flow via the air duct,
    wherein the elements are arranged from the first absorption hole to the main exhaust hole according to an operating temperature of the elements and comprise a power supply unit to supply power, a lamp, and a ballast to operate the lamp, and the at least one fan comprises a first fan arranged between the power supply unit and the ballast and a second fan arranged between the ballast and the lamp.

2. The apparatus of claim 1, wherein the elements are arranged from the first absorption hole to the main exhaust hole according to an operating temperature of the elements so that one of the elements having a lower operating temperature than the other one of the elements is disposed adjacent to the first absorption hole.

3. The apparatus of claim 1, wherein the elements comprises an optical modulator which modulates light irradiated from the lamp to correspond to image data, and the duct further comprises a second absorption hole which communicates with the optical modulator.

4. The apparatus of claim 3, wherein the at least one fan further comprises a third fan which controls the air to flow into the duct via the second absorption hole to cool the optical modulator.

5. The apparatus of claim 4, wherein a cooling capacity of the second fan is larger than a cooling capacity of each of the first fan and the third fan.

6. The apparatus of claim 1, further comprising:
    a vane placed at an outlet of the first fan to induce the air to flow to the ballast.

7. The apparatus of claim 1, further comprising:
an induction duct diverged from the duct at an outlet of the second fan to induce the air flow to a front part of the lamp.

8. The apparatus of claim 1, further comprising:
a light leakage prevention unit placed between the lamp and the main exhaust hole in the duct to prevent light irradiated from the tamp from leaking via the main exhaust hole.

9. The apparatus of claim 8, wherein the light leakage prevention unit comprises a plurality of ribs which extend from an outlet of the lamp to the main exhaust hole and include at least one curvature portion to change an extension direction of the ribs so that the light is cut off.

10. The apparatus of claim 9, wherein the light leakage prevention unit further comprises an uneven portion provided on the ribs and disposed adjacent to an end of the lamp to reflect the light toward the lamp.

11. The apparatus of claim 4, wherein the duct comprises:
a first duct which accommodates the power supply unit and includes the first and second absorption holes;
a second duct which accommodates the ballast and communicates with the first duct; and
a third duct which accommodates the lamp, includes the main exhaust hole, and communicates with the second duct.

12. The apparatus of claim 11, wherein the first duct is a shield to prevent electromagnetic interference (EMI).

13. The apparatus of claim 11, wherein the second duct comprises an absorption member installed on an inner wall thereof to absorb an operating noise of the ballast.

14. The apparatus of claim 11, wherein the second fan is installed in the third duct, and the apparatus further comprising a dustproof member interposed between the second fan and the third duct to absorb vibration and noise generated from the second fan.

15. An image projection apparatus comprising
a first and a second and a third ducts connected in series to form an air-flow path along which air flows within the first and second and third ducts;
an absorption hole formed on the first duct;
a main exhaust hole formed on the third duct;
a lamp disposed in the third duct;
a first and a second elements having a first and a second operating temperatures lower than a third operating temperature of the lamp and disposed in the first duct and the second ducts, respectively; and
an optical system to receive light from the lamp, to modulate the received light according to image data, and to project the modulated light,
wherein the first duct comprises a second absorption hole disposed adjacent to the optical system to cool the optical system.

16. The apparatus of claim 15, wherein the optical system comprises an optical modulator to modulate the received light, and the air disposed adjacent to the modulator is absorbed into the first duct through the second absorption hole.

17. The apparatus of claim 16, further comprising:
a fan disposed adjacent to the second absorption hole of the first duct to absorb the air disposed around the optical modulator into the first duct.

18. The apparatus of claim 15, wherein the air flows the first duct, the second duct, and the third duct along the air-flow path to cool the first and second elements and the lamp sequentially.

19. The apparatus of claim 15, wherein the first element comprises a power supply unit, and the second element comprises a ballast.

20. The apparatus of claim 15, further comprising:
a first fan disposed to control the air to flow from the first duct into the second duct; and
a second fan disposed in the passage to control the air to flow from the second duct into the third duct; and
wherein a cooling capacity of the second fan is larger that that of the first fan.

21. The apparatus of claim 15, further comprising:
a dustproof member disposed between the second and third ducts.

22. The apparatus of claim 15, wherein the third duct comprising an exhaust duct disposed between the lamp and the main exhaust hole to guide the air from the third duct to an outside thereof.

23. The apparatus of claim 22, wherein the exhaust duct comprises two sub-ducts disposed adjacent to the main exhaust hole to guide the air toward the main exhaust hole in a direction different from the air path to prevent a leakage of light emitted from the lamp.

24. The apparatus of claim 22, wherein the exhaust duct comprises an uneven portion to prevent a leakage of light emitted from the lamp through the main exhaust hole.

25. An image projection apparatus to enlarge and project image data on a screen using light emitted from a lamp, the apparatus comprising:
a housing comprising a plurality of sides to house a plurality of elements;
a duct which includes a first absorption hole through which the air is absorbed, and a main exhaust hole through which the air is exhausted, to connect elements that are cooled in series, and to form an air-flow path to cool the elements along lengths of two adjacent sides of the housing; and
at least one fan to control air flow via the air duct,
wherein the elements are arranged from the first absorption hole to the main exhaust hole according to an operating temperature of the elements and comprise a power supply unit to supply power, a lamp, and a ballast to operate the lamp, and the at least one fan comprises a first fan arranged between the power supply unit and the ballast and a second fan arranged between the ballast and the lamp.

26. A cooling apparatus used with an image projection apparatus comprising:
a duct having an air-flow path and having an inlet and an outlet disposed at both ends of the air-flow path;
a first element having a first operating temperature;
a second element having a second operating temperature greater than the first operating temperature;
a third element having a third operating temperature greater than the second operating temperature; and
an optical system to receive light from the third element, to modulate the received light according to image data, and to project the modulated light,
wherein the first, second, and third elements are disposed in the duct along the air-flow path from the inlet toward the outlet in order and the duct further comprises a second inlet disposed adjacent to the optical system to cool the optical system.

27. An image projection apparatus to enlarge and project image data on a screen using light emitted from a lamp, the apparatus comprising:
a duct which includes a first absorption hole through which the air is absorbed, and a main exhaust hole through which the air is exhausted, to connect elements that are cooled in series, and to form an air-flow path to cool the elements, wherein the elements include a power source unit, a ballast, and a lamp in order; and at least one fan to control air flow via the air duct, wherein the elements are arranged from the first absorption hole to the main exhaust hole according to an operating temperature of the elements, the ballast operates the lamp, and the at least one fan comprises a first fan arranged between the power source unit and the ballast and a second fan arranged between the ballast and the lamp.

* * * * *